United States Patent [19]

Bartholomew

[11] Patent Number: 4,893,845
[45] Date of Patent: Jan. 16, 1990

[54] FIREWALL HEATER LINE ADAPTER

[75] Inventor: Donald D. Bartholomew, Marine City, Mich.

[73] Assignee: Proprietary Technology, Inc., Mt. Clemens, Mich.

[21] Appl. No.: 183,640

[22] Filed: Apr. 18, 1988

[51] Int. Cl.$^4$ .......................... F16L 5/00; F16L 37/00
[52] U.S. Cl. ................................ 285/137.1; 285/131; 285/158; 285/179; 285/272; 285/319
[58] Field of Search ..................... 285/137.1, 131, 136, 285/158, 201, 202, 203, 272, 275, 278, 317, 319, 305, 179

[56] References Cited

U.S. PATENT DOCUMENTS

| | | | |
|---|---|---|---|
| 3,212,795 | 10/1965 | Helm et al. | 285/319 |
| 3,328,054 | 6/1967 | Fecho | 285/319 |
| 3,564,113 | 2/1971 | Kindler | 285/137.1 |
| 3,869,153 | 3/1975 | De Vincent et al. | 285/137.1 |
| 3,929,356 | 12/1975 | De Vincent et al. | 285/137.1 |
| 4,083,133 | 4/1978 | Ravesteyn et al. | 285/137.1 |
| 4,601,497 | 7/1986 | Bartholomew | 285/319 |

Primary Examiner—Dave W. Arola
Assistant Examiner—Anthony Knight
Attorney, Agent, or Firm—Harness, Dickey, Pierce

[57] ABSTRACT

A method for communicating two pressure confining conduits through a wall by means of an adapter that mounts two swivelable elbows that act as conduits and conduit junctions is shown. An automotive heater application is described wherein the disclosed method allows standardization of heaters, firewall or climate package through-wall parts. Accommodation of varying the location of the through-wall adapter and heater by merely altering the communicating conduit lengths which are plugged into the adapter and heater, even when the adapter and heater are previously fixably mounted as shown. The method allows the use of the same adapter and heater across many different car lines.

8 Claims, 2 Drawing Sheets

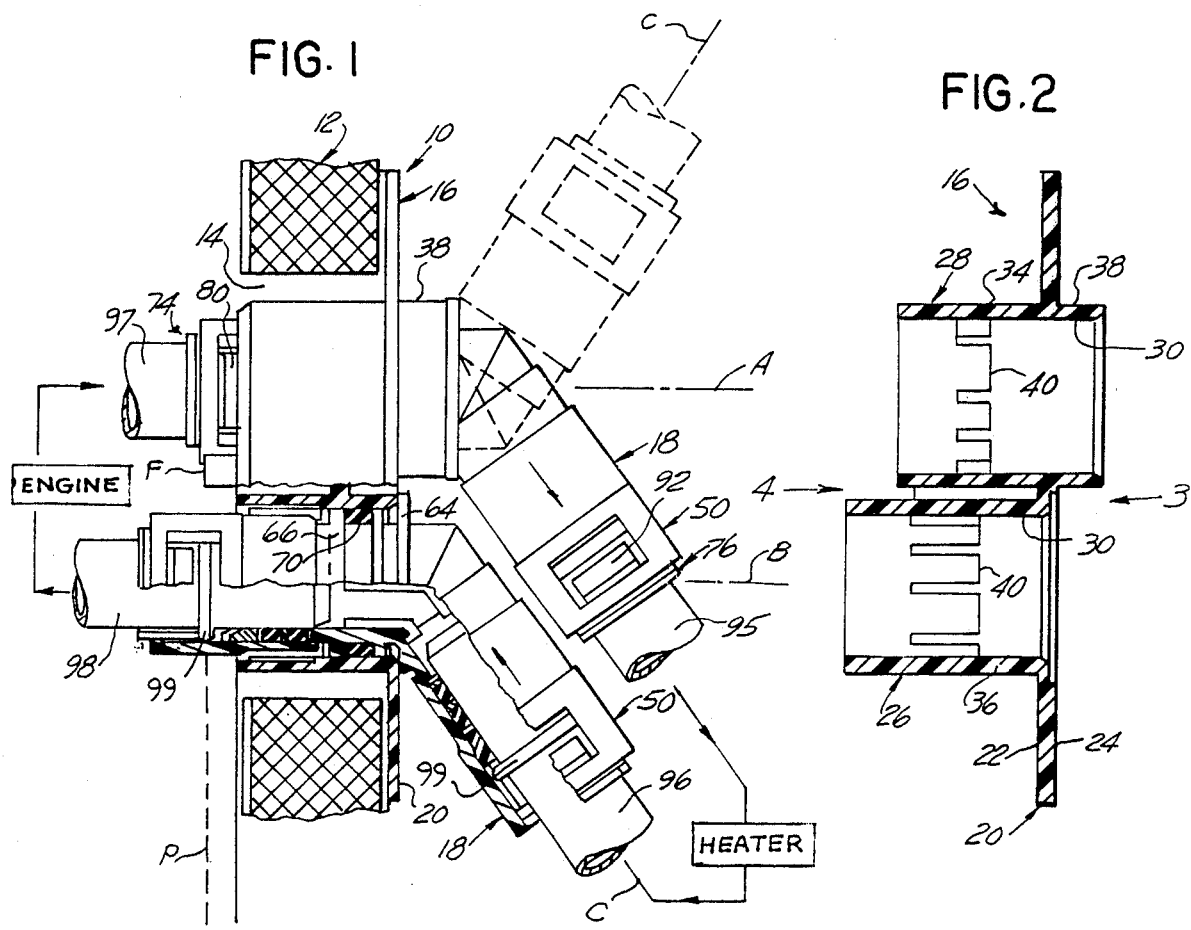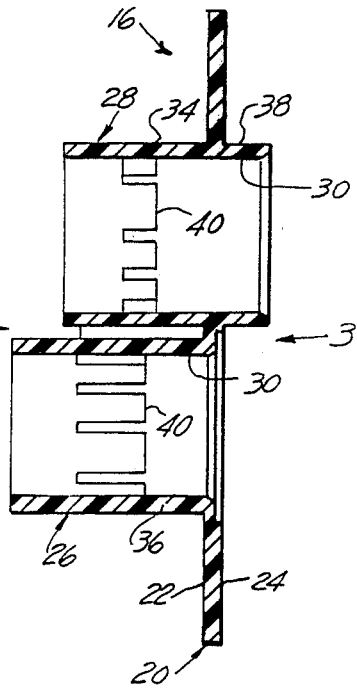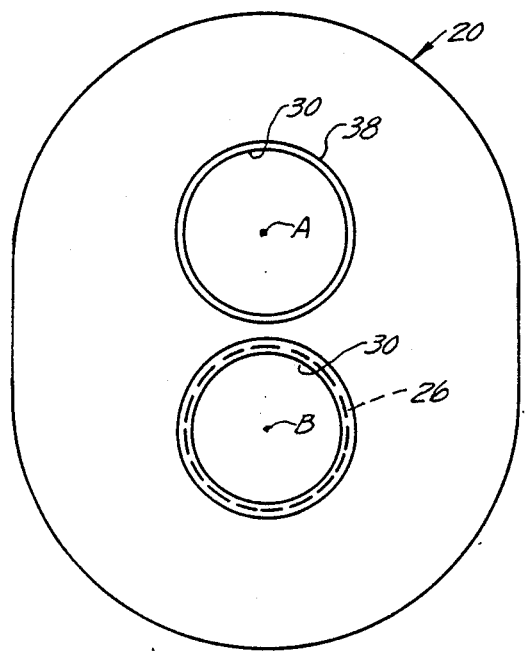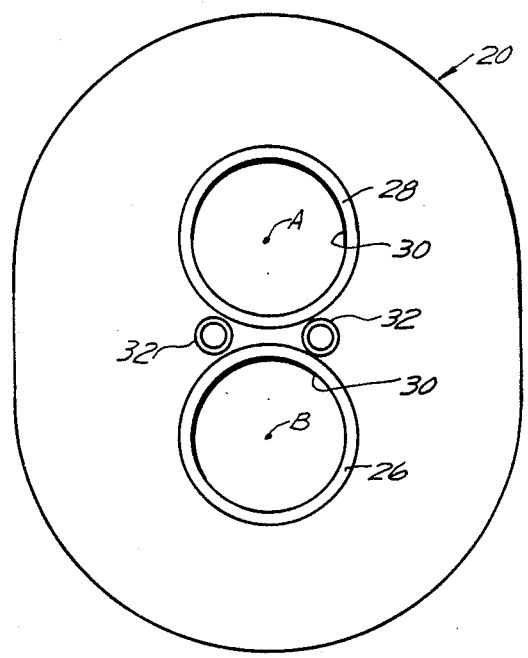

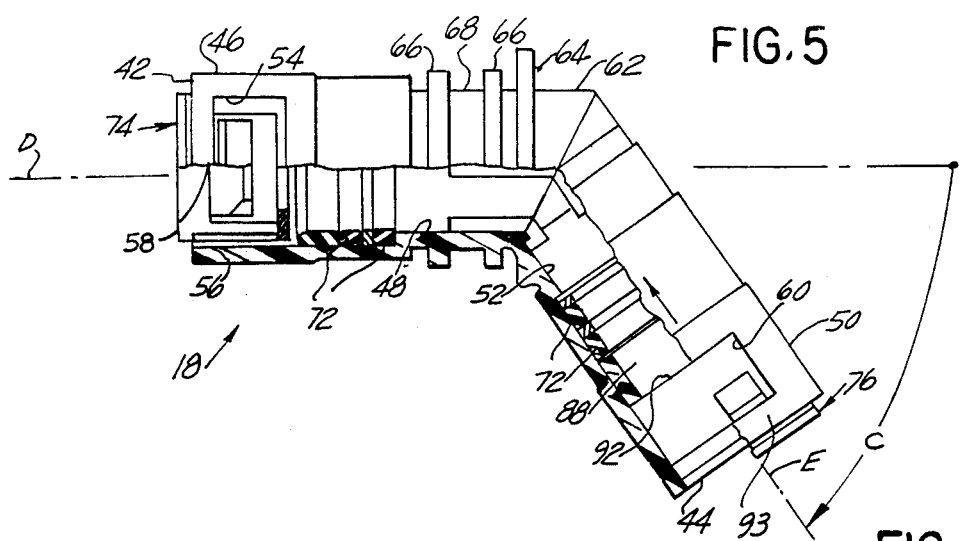
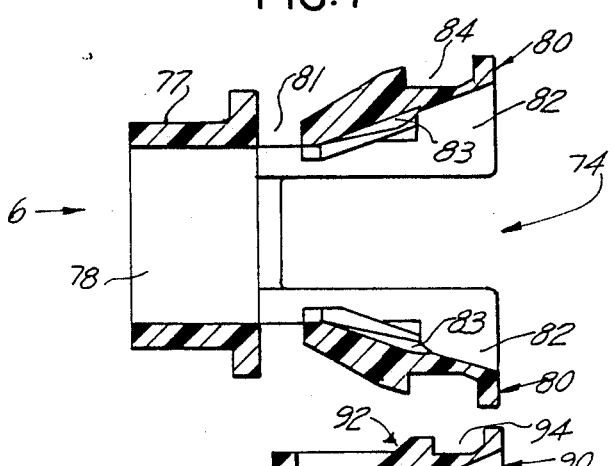
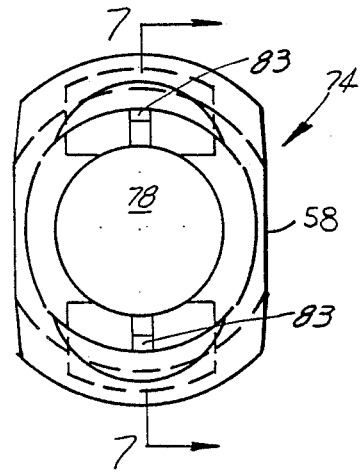
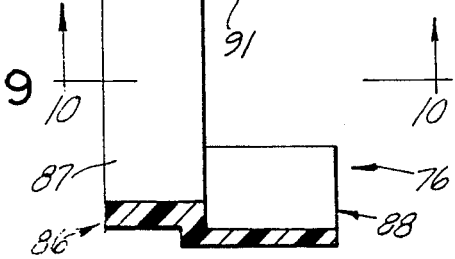
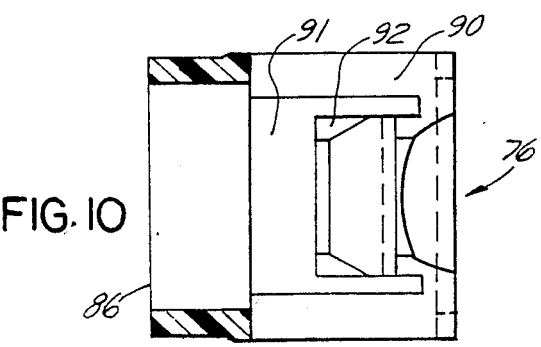

FIREWALL HEATER LINE ADAPTER

BACKGROUND AND SUMMARY OF THE INVENTION

This invention relates to a firewall heater line adapter mountable in the firewall of an automobile and more particularly to an adapter which is adjustable relative to the firewall opening in which it is mounted and configured to interconnect standard fluid conduits but yet be angularly adjustable to accommodate different lengths and angular disposition of mating conduit ends.

Numerous automobiles transfer heated fluids from the engine through a firewall into a heater on the passenger side of the firewall. Because of the differences in fluid conduit lengths, angular positions and opening afforded in the firewall by different vehicle models, interconnections can require another "extender" tube for completing the fitment. It would be desirable to provide a "universal" adapter which has inlet and outlet ports to pass heated fluids for use and which will fit within the space and orientations available in a great number of different firewalls, the outlet and inlet ports in the passenger area being angularly positionable for mating to the heater which may also be fitted with a quick connector and the adapter being adapted to be easily mounted and sealed horizontally and vertically positionable relative to the firewall opening.

A primary object of this invention is provision of an adapter bracket positionable in a firewall opening and including a fluid port connection arrangement permitting the angular position of adapter ports to be changed in order to releasably receive and swivelably retain conduits discharging and returning heated fluids to a fluid reservoir such as an engine.

Another object of this invention is provision of an adapter which has quick release inlet and outlet conduits mountable within the adapter for exchangeable use in releasable swivelable retention of standard fluid lines.

In accordance with the present invention there is provided a flowthrough connector assembly for passing fluid at a high heat, comprising, in combination, an adapter body, mounting means for mounting the adapter body at desired positions relative to an opening in a vertical support wall to which the adapter is to be mounted, the body including removably mounted angularly positionable elbows one for receiving and passing heated fluids discharged from the engine and the other for passing and returning fluids to the engine. Quick release retainer clips are disposed in each elbow for releasably retaining respective conduits mated therewith to complete a closed fluid flowthrough between the engine and the heater passing fluids and supplied with the automobile.

A further object of the invention is to provide a means by which adaptation of the hardware required for piping the heater inlet and return through the firewall from the engine.

Additional objects and advantages of the present invention will become apparent from reading the detailed description of the preferred embodiments which makes reference to the following set of drawings:

BRIEF DESCRIPTION OF THE DRAWINGS

FIG. 1 is a side elevation view partially in section of a flowthrough heater line adapter mounted in the opening of a firewall, the adapter for passing a heated fluid from an engine to a heater in the passenger areas of an automobile and from the heater back to the engine;

FIG. 2 is a side elevation view in section of an adapter body shown in FIG. 1;

FIGS. 3 and 4 are plan views of the adapter body as seen, respectively, from the engine and passenger side of the firewall and as indicated by the arrows 3 and 4 in FIG. 2;

FIG. 5 is a section view partially in section of an elbow mounted in the adapter body of FIG. 1;

FIG. 6 is an end view of a releasable retainer member used at one end of the elbow taken in the direction of the arrow 6 in FIG. 7;

FIG. 7 is a side elevation view in section of the retainer member taken along line 7—7 of FIG. 6;

FIG. 8 is an end view of a releasable retainer element used at the other end of the elbow;

FIG. 9 is a side elevation view in section taken along line 9—9 of FIG. 8; and

FIG. 10 is a bottom plan view partial in section taken along line 10—10 of FIG. 9.

DETAILED DESCRIPTION OF THE PREFERRED EMBODIMENT

A firewall heater line adapter is shown and designated by reference numeral 10. The adapter is configured to be mounted in an opening 14 in a firewall 12 thereby to receive fluids discharged from an engine (not shown) and pass them through the opening to a heater system (not shown) on the passenger side of the firewall, and then pass the fluids back through the firewall to the engine. A closed flowthrough fluid assembly is defined when suitable conduits are mated to the adapter.

Firewall 12 is typically comprised of a heat resistant material and generally protects passengers from gases, dirt and other material being passed from the engine area. Opening 14 is sufficiently large to allow a central portion of the adapter to pass whereby mateable ends may interconnect fluid conduits on the opposite sides of the firewall.

Firewall adapter 10 includes an adapter body 16 integrally molded of a high temperature resistant polymeric material such as copolymer polypropylene and a pair of tubular elbows 18 each being molded from a suitable plastic and mounted for rotation in the adapter body. Adapter body 16 includes a generally flat, elliptically shaped, support plate 20 having top and bottom surfaces 22 and 24, a pair of tubular conduits 26 and 28 each defining a central cylindrical passageway 30, and a pair of cylindrical bosses 32 each centrally threaded and used in connection with fasteners "F" and a fastener plate "P" to mount the adapter to the firewall. Passageways 30 are defined by parallel axes "A" and "B" each generally perpendicular to plate 20.

Tubular conduits 26 and 28 are of substantially the same length with each having in the embodiment shown a respective first portion 34 and 36 extending generally perpendicularly from surface 22 and conduit 28 including a second portion 38 extending generally perpendicularly from surface 24 on the other side of the plate. The first portions 34, 36 extend into opening 14 and portion 36 is generally coextensive with the thickness dimension of the firewall. Raised shoulders 40 are provided on the inner walls of passageways 30 to resist withdrawal of elbow 18 therefrom.

Elbow 18 is generally cylindrical, and includes between its opposite end faces 42 and 44 a first portion 46 having a passageway 48 and an outer periphery defined by a diameter adapted to interferencingly fit the elbow first portion into passageway 30 of a respective conduit 26 or 28, and a second portion 50 having a central passageway 52 and adapted to extend outwardly from surface 24. The axes "D" and E"defining first and second portions 46 and 50 are such that portion 50 is at an acute angle "C" to portion 46 with each elbow 18 being adapted to rotate relative to adapter body 12 when the elbow first portions 46 are inserted within a respective conduit. An acute angle "C" of between 40 and 60 degrees is suitable with about 45° being preferred.

First portion 46 is configured such that its end face 42 is substantially flush with the axial end face of either conduit when mounted therein and includes a pair of angularly aligned axially extending openings 54 and a constriction defined by a pair of angularly spaced axial flats 56, each flat cooperating with flats 58 on retainer member 74 inwardly of end face 42. As will be discussed, flats 56 function as keys to guide a retainer member 74 or 76 into the elbow whereupon the retainer locks against a housing abutting wall to resist unwanted withdrawal.

Second portion 50 includes a single opening 60 adjacent end face 44. The shape of portion 50 functions to orient a retainer 76 so that it will properly fit within passageway 52 and interlock releasably with opening 60.

The outer periphery of elbow 18 includes a reduced diameter portion 62 from which a circular plate 64 and a pair of circular shoulders 66 extend radially outwardly. The plate 64 defines a limit on inward axial insertion of the elbow into its passageway. Circular shoulders 66 are axially spaced a distance sufficient to define an annular groove 68 to receive a sealing member 70.

An elastomeric O-ring type seal 70 is disposed in groove 68 and compressed radially between the inner wall defining passageway 30 and the outer periphery of the elbow to seal the elbow to inhibit air or fluids from passing therethrough. To assure that a leak-free interconnection exists between the elbow and the mating conduits, annular elastomeric seals and/or gaskets 72 are operatively positioned interiorly of the elbows to axially seal between the elbow and the tubular conduits that is inserted into the elbow.

Retainer members 74 and 76 are provided at opposite ends of each elbow to releasably retain fluid conduits, each retainer member being integrally formed from a polymeric material. Retainer member 74 includes a cylindrical collar 77 having a central opening 78 and a pair of arms 80, each arm extending coaxially from collar 77. The arms have an angular extension substantially coextensive with the angular extension of opening 54 in elbow 18 whereby to be keyed by the flats 56 for fitment in the passageway such that the arms 80 register and interlock with the abutting wall portion of opening 54. Each arm 80 includes a resilient radially deflectable locking beam 82 and an outwardly opening channel 84 for captivating engagement with the elbow. An axial space 81 is defined between collar 77 and the deflectable free ends of beams 82, the space being sized to captivate a rounded annular retention collar 99 on the mating end of a tubular fluid conduit inserted into elbow portion 46. An axial rib 83 is disposed on the beams 82 which resists insertion of the fluid conduit until the installer applies enough push-in force to result in the fluid conduit rapidly traveling completely and locking when the retainer resistance is overcome.

Retainer member 76 includes a cylindrical collar 86 having a central opening 86, and a first and a second arm 88 and 90 with the first arm 88 being provided for stability required when arm 90 is operated to engage to, or disengage from housing engaging area 60. The second arm 90 is generally flat and includes a deflectable locking ear 92 and an outwardly opening channel 94 for captivating engagement with an annular end portion 93 forming part of opening 60 in elbow portion 50. An axial space 91 defined between collar 86 and the deflectable free end of locking ear 92 captivates retention collar 99 when the fluid conduit is inserted into elbow portion 50.

For assembly, the elbows 18 would be fitted with their respective seals and gaskets 70 and 72 and the retainer members 74 and 76 are thrustingly inserted within a respective tubular conduit 26 or 28. The adapter 10 would then be positioned within the confines of the opening 14 as defined and backing plate P secured thereto by fasteners F threadably interengaging the plate and the bosses 32. Thereafter the desired fluid conduits 95, 96, 97 and 98 would be inserted into elbow portions 46 and 50.

In the passenger side of the interconnection, second end portions 50 of the elbows can be rotated such that the angular position of one end face can be distant to the other elbow end face to be proximate to the desired fluid line to be accommodated. FIG. 1 shows that the second end portions 50 of the elbows can be adjacent one another (shown by the solid lines) and angularly separated (shown by the phantom lines for upper elbow portion). As such, the included angle between axes "C" can approach 180° while allowing complete rotation of the elbow in the adapter. Alternatively, the fluid lines may be connected to the end portions of the elbows first when the adapter is in the firewall opening and then, depending on the give and tolerance of the interconnected conduits, the adapter may be adjusted relative to the firewall opening and then secured by the fasteners "F" and plate "P".

While two fluid lines are interconnected it is to be understood that what is broadly disclosed is a flow-through assembly which can be used with more than two fluid lines. The angle of the elbow portions 50 will allow each elbow portion 50 to undergo a rotation for mating. Also, depending on the elbow, one elbow portion 50 or conduit portion 38 can limit by the other elbow portion 50 to less than 360° of rotation.

When used in a heater system in a vehicle it is possible to construct the elbow ports 50 so that conduits 95 and 96 may be moved inward and outward along axis "C" or wobbled about axis "C" without disruption of the fluid tight seal. This permits the attaching of connections at the opposite end of conduits 95 and 96 when the firewall heater adapter and the heater are already mounted in the vehicle, and conduits 95 and 96 are rigid conduits. This is a very important feature in that mounting and connectors of the various components does not have to occur with the previous scheduling limitations, the heaters are more easily removed and replaced, and design changes that require the relocation of the heater or line adapter may be accomplished with only changing the conduits 95 and 96. Also since conduits 95 and 96 are not permanently attached to the heater a standardized heater may be used across many car lines.

While the above description constitutes the preferred embodiments of the present invention, it will be appreciated that the invention is susceptible to modification, variation and change without departing from the proper scope and fair meaning of the subjoined claims.

I claim:

1. A flowthrough connector assembly for passing a high heat fluid between first and second reservoirs separated by a wall having an opening therein, comprising in combination an adapter body mountable on said wall and including at least two tubular conduits each defining a central passageway and extending into the opening, a pair of angled elbows each having a first and a second end portion, each elbow being adapted to have its first end portion removably mounted in a respective conduit such that its second end portion is spaced from the adapter and positionable angularly for desired mating, the elbows being independently angularly positionable relative to one another, and retainer means in each said elbow for retaining a fluid conduit in a swivelable sealed connection therewith, each said elbow and fluid conduit being swivelable independently of one another.

2. The flow through connector assembly as recited in claim 1 wherein said retainer means comprises each said elbow having a shoulder adjacent each of its ends and a tubular polymeric retention clip being received in each said end portion, said clip having a resilient finger for engaging a respective shoulder in the elbow thereby retaining the clip in the elbow and a resilient locking tab for seating engagement behind an annular collar of the fluid conduit to be releasably retained.

3. The flow through connector assembly as recited in claim 1 wherein said adapter body and conduits are integrally molded of a heat resistant polymer.

4. The flow through connector assembly as recited in claim 3 wherein the elbows are molded of a heat resistant polymer.

5. The flow through connector assembly as recited in claim 1 wherein the body member comprises a thin flat plate, and the conduits are sized such that each extends from one side of the plate and through the opening substantially the entire width of the firewall, one said conduit extending from the other side of the plate.

6. The flow through connector assembly as recited in claim 5 wherein the elbows are identical whereby one said elbow has its second end portion positioned further outwardly from said plate that the other said elbow.

7. An adapter for coupling fluid conduits, comprising an adapter body including two adjoining conduit receiving passageways the axes of the passageways being generally parallel to one another, a pair of tubular elbows, each elbow having first and second end portions and a central passage extending between its ends for conveying a fluid therebetween, the first and second end portions of each elbow being disposed at an acute angle to one another with the first end portions of the elbows being swivelably releasably mounted in a respective conduit and the second end portions extending outwardly from the adapter body such that rotation of the first end portions angularly change the position of the second end portions for mating with respective fluid conduits, and retainer means in the end portions for swivelably releasably retaining a fluid conduit in the respective elbow end portions.

8. Apparatus, mountable in an opening on a wall separating a pair of reservoirs, for passing a fluid from one reservoir to the other reservoir and back to the one reservoir, comprising a pair of couplings each coupling having opposite end portions angled one to other, retention clips releasably mounted in the opposite end portions of said couplings for swivelably, releasably, retaining a respective fluid conduit, a pair of tubular conduits extending into the opening for supporting respective adjacent one end portions of the couplings for rotation, one said tubular conduit being of a length greater than the other said tubular conduit such that the other end portion of said one coupling extends further outwardly from the wall than the other coupling so as to be angularly positionable remote to the wall, each end portion of each coupling receiving and retaining a fluid conduit for communicating fluid from or to said reservoirs, each said fluid conduit when retained in an end portion of said coupling completing a swivelable fluid tight connection.

* * * * *